A. GARELLI.
ENGINE FOR MOTORCYCLES AND THE LIKE.
APPLICATION FILED NOV. 8, 1919.
1,377,879.
Patented May 10, 1921.
2 SHEETS—SHEET 1.
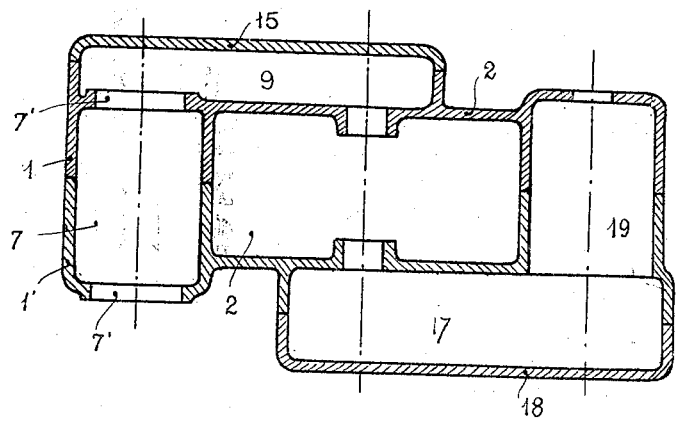
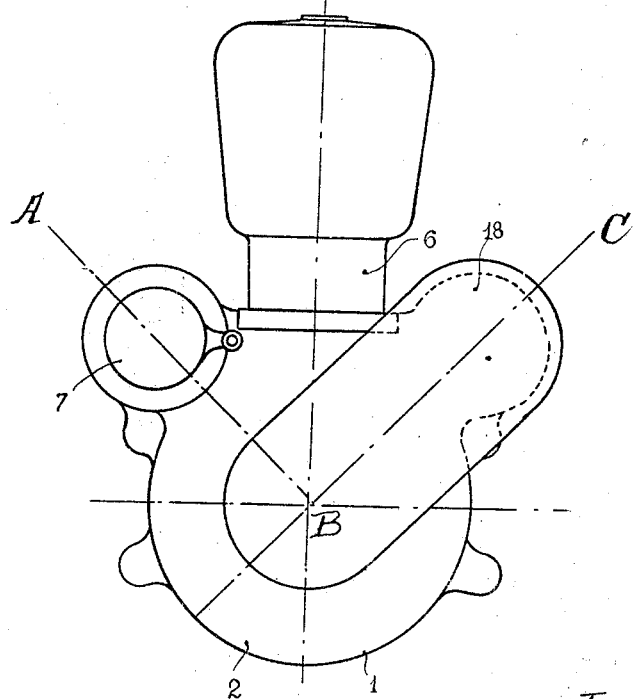
Inventor:
Adalberto Garelli
By
Attorney

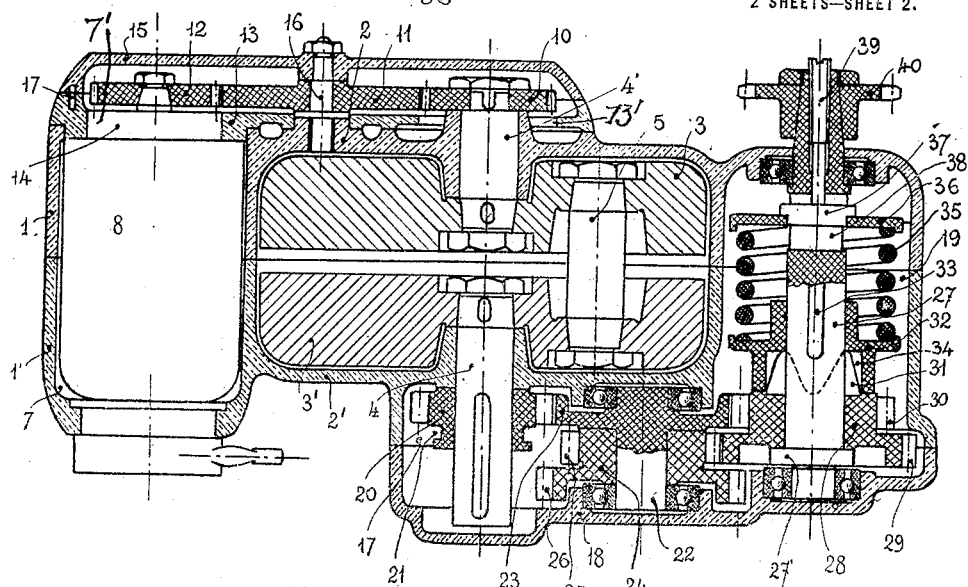

UNITED STATES PATENT OFFICE.

ADALBERTO GARELLI, OF MILAN, ITALY.

ENGINE FOR MOTORCYCLES AND THE LIKE.

1,377,879. Specification of Letters Patent. Patented May 10, 1921.

Application filed November 8, 1919. Serial No. 336,650.

*To all whom it may concern:*

Be it known that I, ADALBERTO GARELLI, a subject of the King of Italy, residing at Milan, Italy, have invented certain new and useful Improvements in Engines for Motorcycles and the like, of which the following is a specification.

This invention relates to explosion engines, particularly of the kind adapted for driving motor cycles and like vehicles, and has for its object an improved arrangement and combination of parts embodying the several members and devices coöperating with said engine for driving the vehicle and for controlling the running of the same.

The combination of parts according to this invention is particularly useful in connection with motor cycles and like vehicles as in the same all the engine parts and devices coöperating with the engine, as change speed gear, clutch and the like, are inclosed within the engine casing so as to make easy the mounting of the same on the vehicle frame, reduce the space required by said parts and protect them against dust, mud and other external agents.

The annexed drawings show by way of example a construction of engine according to this invention and Figure 1 is a side view of the engine; Fig. 2 is a diagrammatic section, made along line A—B—C of Fig. 1, of the engine casing; Fig. 3 is a like section on an enlarged scale of a construction comprising the several engine parts and coöperating members housed within said casing; Fig. 4 is a detail sectional view showing a clutch and Fig. 5 is a detail sectional view of a device which is preferably used for damping the sudden variations in speed and for reducing the shocks produced by the same on the gear parts.

As shown by Figs. 1, 2 and 3, the engine casing consists of two sections 1 and 1' adapted to be joined together along the middle plane of the casing and comprising a portion providing a crank case 2 in which are located the crank disks 3 secured on sections 4—4' of the driving shaft which are journaled in said case; said disks 3 are provided with a crank pin 5 adapted to be coupled by a connecting rod (not shown) with the piston mounted in the cylinder 6 in the usual and well known manner.

The casing sections also provide a chamber 7 adapted to inclose the ignition magneto indicated generally at 8, Fig. 3; in the construction illustrated said magneto chamber 7 has a cylindrical shape but the same may have any other desired shape according to the type of magneto to be arranged therein.

Section 1 is shaped to provide a chamber 9 intended to inclose pinions 10—11—12 driven by the engine shaft section 4' and operating the magneto shaft as well as, if required, the distribution gear, this gear being not shown in the drawing as the engine is assumed to be a two stroke valveless one.

For the purpose of freely removing and inserting the magneto within its chamber 7 in the construction shown by Fig. 3 the casing section 1 is provided with an opening having the same width and shape as chamber 7 and a partition 13 is arranged in contact with the upper wall of the crank case 2, said partition providing a restricted opening 7' which receives a portion 14 of the magneto so as to clamp said magneto in its chamber 7. A cover 15 is provided to close the chamber 9 in front of partition 13 and is secured by a central bolt 16 secured to case 2 and passing through a hole in partition 13; said bolt serves also as a pivot for the intermediate or loose pinion 11.

Cover 15 is held in place on partition 13 by means of a pin 17 which is fixed to one of said parts and fits in a recess in the other.

It is thus very easy to inspect and remove said pinions and magneto as by unscrewing the nut of bolt 16 the cover 15 may be removed to leave pinions 10—11—12 uncovered; furthermore, the partition 13 may be removed for taking off the magneto without removing pinions 10 and 12 from their respective shafts as the openings 13' and 7' in said partition permit the latter to pass freely over said pinions.

The engine casing further provides a chamber 17' located on one side of the crank case and closed by a removable cover 18, said chamber 17' leading to another chamber 19 extending parallel to the engine shaft; these chambers are intended to contain the friction clutch as well as the change speed gear and a shock damping device as hereinafter described.

Said change speed gear comprises a pinion 20 keyed to the engine shaft section 4 and adapted to be shifted along the same, this pinion being controlled by means of a groove 21 engaged by a controlling member of any proper type not shown. Parallel to said engine shaft 4 is mounted in said chamber 17' a shaft 22 having a pinion 23 fixed to it; this shaft is preferably journaled by means of ball bearings seated in recesses in crank case wall 2 and cover 18.

Loose on said shaft 22 is mounted a sleeve 24 having two toothed rims 25—26 one of which, as 26, has the same diameter as pinion 23 while the other one 25 has a different diameter; said pinion 20 is therefore adapted to be carried to mesh with either pinion 23 or 26 or to be carried in an intermediate position in which it runs freely without engaging either of said pinions.

Within chamber 19 is journaled, by means of ball bearings, a shaft 27, parallel with the engine shaft, on which is loosely mounted a sleeve 28 having two toothed rims 29—30 meshing with pinions 25 and 23 respectively; said sleeve is provided with a serrated edge forming teeth 31 as shown by the drawing.

A drum 32 is mounted on said shaft 27 and this drum is fixed to rotate with said shaft, say by means of a cotter or key 33, but is free to move longitudinally thereon and is provided with a serrated edge having teeth 34 engaging the recesses between teeth 31 of sleeve 28. Drum 32 and sleeve 28 are held in engagement with each other by a spring 35 bearing against said drum and resting against a disk 36 loosely mounted on said shaft; this disk in turn bears against a transverse member 37 located within a slot 38 in shaft 27 and operated by an adjusting spindle 39 screwed in a central hole of shaft 27. Finally shaft 27 is provided outside of said casing, with a sprocket wheel 40 intended to operate the chain driving the vehicle wheel.

By shifting pinion 20 along shaft 4, the speed change and loose running are obtained because when said pinion meshes with pinion 23 the sleeve 28 and therefore shaft 27 and sprocket wheel 40 are driven under a given ratio while when pinion 20 meshes with sprocket 26, said pinion and shaft are operated by means of toothed rims 25—29 and therefore under a different ratio. By shifting said pinion 20 into an intermediate position so as to be out of mesh with both pinions 23 and 26 said pinion 20 is allowed to run without operating shaft 27.

The device mounted on shaft 27 is intended to damp the shocks acting on the gear parts on starting or effecting speed change generally under any like circumstance. The operation of the same is as follows: On a sudden variation in the relative speeds between sleeve 28 and shaft 27 taking place, say on starting or on a too great resistance acting on the vehicle wheel or in any like circumstance, the teeth 31 of sleeve 28 acting on the teeth 34 of drum 32 cause the latter to move axially against the action of spring 35 and therefore the transmission of the strain from one to another of said parts takes place in a gradual manner.

The adjusting spindle 39 allows of adjusting the spring pressure and therefore the operation of the device.

The shaft 27 is preferably provided with an integral collar 27' on which rests sleeve 28 under the action of spring 35 which at its other end bears against parts 36, 37 and 39 and therefore against the shaft 27; thus the action of said spring is balanced and the same does not load the bearings nor produce an endwise thrust on the casing parts.

Fig. 4 shows a construction of friction clutch which is particularly adapted for use in connection with the engine according to this invention, the same being so designed as to be inclosed within the chamber 19 provided in the engine casing. In this construction the sleeve 28 having two toothed rims 29 and 30 as hereinbefore described, is loosely mounted on shaft 27 and is provided with a cup 41 having longitudinal teeth or projections 42 adapted to engage the disks 43 which are similar to the disks of ordinary multiple disk clutches. The flanged sleeve or drum 32 is mounted to slide on said shaft 27 and is connected to rotate therewith say by means of the key 33, and said sleeve is provided with projections 44 engaging disks 45 adapted to contact with the disks 43 above referred to.

Spring 35 acts to push the flanged sleeve 32 against cup 41 to clamp therebetween disks 43—45 so as to couple said shaft 27 and sleeve 28 together, the flanged sleeve 32 is controlled for the purpose of releasing the clutch by a transverse member 46 located in a slot 47 in said shaft, this member being actuated by a rod 48 mounted to move in a central hole in shaft 27; by shifting axially rod 48 the member 46 removes sleeve 32 from cup 41 and therefore disks 43—45 are left free and the clutch is released.

Also in this construction the shaft 27 is provided with an integral collar 27' adapted to balance the spring thrust against sleeve 28.

Fig. 5 shows a modified construction of said shock damping device; in this construction the device is mounted on the engine shaft 4 and comprises a sleeve 49 loosely mounted on said shaft 4 and provided on its outer surface with means as longitudinal projections 50 adapted to engage pinion 20 in rotation but to allow the pinion to be shifted longitudinally. Said sleeve is provided with a flange 51 entering a recess of crank disk 3 and has projecting teeth 52 engaging a friction disk 53 while the crank disk recess has like projections 54 engaging another disk 55 intermediate said disk 53 and flange 51. Said shaft 4 is provided at its end with a nut 56 and a spring 57 is wound on said shaft between said nut and the edge of sleeve 49 so as to push this latter with its flange 51 against disks 53—55 for the purpose of causing crank disk 3 and flanged sleeve 49 to be coupled to rotate together. Obviously when a sudden variation in transmitting conditions arises, say the clutch is suddenly closed or the vehicle is braked, the frictional engagement of disks 53—55 is overcome, this being allowed by spring 57, and a rotation of crank disk 3 with regard to sleeve 49 and associate parts is permitted.

The pressure of spring 57 may be adjusted by means of nut 56 which is enclosed within a cap 58 screwed or otherwise secured on the cover 18 of the casing chamber.

The crank case is suitably provided with a packing gland 59, this provision being particularly useful in two stroke engines drawing the mixture from their crank case.

Obviously both the clutch and shock damping device may be applied in the same engine and may be arranged in a different manner than that above described and illustrated; say the clutch may be mounted on the engine shaft and the shock damping device may be mounted on the shaft of the sprocket wheel.

Further in the change speed gear as illustrated in Fig. 3 the pinion 23 may be loosely mounted on a fixed stud or axle instead of being attached to an axle which is itself loose as illustrated, and said change speed gear may be provided with more than two pinions similar to 23 and 26, so as to provide a larger number of transmission ratios.

In any case by the arrangement according to this invention an engine is obtained which is particularly adapted to use in motor cycles as the same embodies all the parts and devices required for driving the wheels and controlling the running of the vehicle, said parts being further adapted to be easily inspected and removed and being fully protected from external agents.

What I claim as my invention and desire to secure by United States Letters Patent is:

1. An explosion engine for motorcycles and the like, comprising a casing having a plurality of chambers therein; a crank shaft, a magneto, a change-speed gear and a transmission device each in one of said chambers; a partition removably secured to said casing and having an opening wherein the magneto seats; a removable cover on said partition coöperating therewith to provide a chamber; and a set of driving pinions for the magneto arranged in the last-named chamber and including a pinion on the magneto shaft disposed coaxially with the opening in said partition and having a smaller diameter than said opening so as to enable it to pass therethrough.

2. An explosion engine for motorcycles and the like, comprising a casing having a plurality of chambers therein; a crank shaft, a magneto, a change-speed gear and a transmission device each in one of said chambers; a partition removably secured to said casing and having an opening wherein the magneto seats; a removable cover on said partition coöperating therewith to provide a chamber; a bolt fastening said cover and partition together; and a set of driving pinions for the magneto arranged in the last-named chamber and including a pinion mounted on said bolt and a pinion mounted on the magneto shaft, the second-named pinion being disposed co-axially with the opening in said partition and having a smaller diameter than said opening so as to enable it to pass therethrough.

3. An explosion engine for motorcycles and the like, comprising a casing having a plurality of internal chambers; a crank shaft, a magneto and a driving gear for the magneto each in one of said chambers; a change-speed gear in another chamber and connected to be driven from the crank shaft; a shaft mounted in still another chamber and driven by the change-speed gear; a driving part mounted on the last-named shaft; and an adjustable lost-motion connection between said driving part and shaft.

4. An explosion engine for motorcycles and the like, comprising a casing having a plurality of internal chambers; a crank shaft, a magneto and a driving gear for the magneto each in one of said chambers; a change-speed gear in another chamber and connected to be driven from the crank shaft; a shaft mounted in still another chamber and driven by the change-speed gear; a driving part mounted on the last-named shaft; and an adjustable lost-motion friction connection between said driving part and shaft.

5. An explosion engine for motorcycles and the like, comprising a casing having internal partitions providing a central crank case and a pair of chambers located on opposite sides of said case with their axes parallel with the axis of the case; a crank shaft in said case; a magneto in one of said chambers; a friction clutch in the other chamber; means on opposite faces of the casing providing a pair of chambers disposed transverse to the crank case; a driving gear for the magneto in one transverse chamber; and a change-speed gear in the other transverse chamber connected to be driven by said crank shaft and to drive said friction clutch.

6. An explosion engine for motorcycles and the like, comprising a casing having internal partitions providing a central crank case and a pair of chambers located on opposite sides of said case with their axes parallel with the axis of the case; a crank shaft in said case; a magneto in one of said chambers; a friction clutch in the other chamber; means on opposite faces of the casing providing a pair of chambers disposed transverse to the crank case; a driving gear for the magneto in one transverse chamber; a removable cover common to said transverse chamber and the magneto chamber; a change-speed gear in the other transverse chamber connected to be driven by said crank shaft and to drive said friction clutch; and a removable cover common to the last-named transverse chamber and the friction clutch chamber.

In testimony whereof I affix my signature.

ADALBERTO GARELLI.